(12) United States Patent
Ho et al.

(10) Patent No.: US 9,578,570 B2
(45) Date of Patent: *Feb. 21, 2017

(54) METHODS AND SYSTEMS FOR SWITCHING OVER A VOICE CALL

(71) Applicant: TP Lab Inc., Palo Alto, CA (US)

(72) Inventors: Chi Fai Ho, Palo Alto, CA (US); Shin Cheung Simon Chiu, Palo Alto, CA (US)

(73) Assignee: TP Lab Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,663

(22) Filed: Aug. 14, 2015

(65) Prior Publication Data

US 2015/0358878 A1    Dec. 10, 2015

Related U.S. Application Data

(63) Continuation of application No. 14/457,643, filed on Aug. 12, 2014, now Pat. No. 9,198,103, which is a continuation of application No. 13/598,133, filed on Aug. 29, 2012, now Pat. No. 8,838,083, which is a continuation of application No. 12/835,402, filed on Jul. 13, 2010, now Pat. No. 8,295,821, which is a continuation of application No. 11/615,636, filed on Dec. 22, 2006, now Pat. No. 7,778,630.

(51) Int. Cl.
*H04W 36/00* (2009.01)
*H04W 36/14* (2009.01)
*H04L 29/06* (2006.01)

(52) U.S. Cl.
CPC ......... *H04W 36/14* (2013.01); *H04L 65/1083* (2013.01); *H04W 36/0066* (2013.01)

(58) Field of Classification Search
CPC ............... H04L 51/04; H04L 65/1083; H04M 2203/4536; H04M 2203/651; H04M 7/0045; H04W 36/0066; H04W 36/14
USPC ......................................... 455/436
See application file for complete search history.

(56) References Cited

U.S. PATENT DOCUMENTS

| 7,778,630 | B2 | 8/2010 | Ho |
| 2006/0023695 | A1 | 2/2006 | Yarlagadda et al. |
| 2006/0286984 | A1* | 12/2006 | Bonner ................. H04W 36/14 455/445 |
| 2007/0094374 | A1 | 4/2007 | Karia |
| 2007/0167167 | A1 | 7/2007 | Jiang |
| 2007/0280445 | A1 | 12/2007 | Shkedi |
| 2008/0133580 | A1 | 6/2008 | Wanless et al. |

FOREIGN PATENT DOCUMENTS

KR    20050001924 A    1/2005

OTHER PUBLICATIONS

Office Action for corresponding U.S. Appl. No. 12/835,402, dated Feb. 28, 2012.

(Continued)

*Primary Examiner* — Timothy Pham
(74) *Attorney, Agent, or Firm* — Timothy X. Gibson, Esq.; Gibson & Dernier LLP

(57) ABSTRACT

Systems and methods for switching a voice call from an Instant Messaging (IM) based voice network to a second voice network. A telephone adapted to switch a voice call from an Instant Messaging (IM) based voice network to a second voice network.

24 Claims, 3 Drawing Sheets

(56) References Cited

OTHER PUBLICATIONS

Office Action for corresponding U.S. Appl. No. 13/598,133, dated Jan. 3, 2013.
Office Action for corresponding U.S. Appl. No. 13/598,133, dated Apr. 26, 2013.
Office Action for corresponding U.S. Appl. No. 13/598,133, dated Sep. 3, 2013.
Office Action for corresponding U.S. Appl. No. 13/598,133, Jan. 6, 2014.

* cited by examiner

METHODS AND SYSTEMS FOR SWITCHING OVER A VOICE CALL

CROSS-REFERENCE TO RELATED APPLICATIONS

This application is a continuation of U.S. patent application Ser. No. 14/457,643, filed Aug. 12, 2014, which is a continuation of U.S. patent application Ser. No. 13/598,133, filed Aug. 29, 2012, issued as U.S. Pat. No. 8,838,083, which is a continuation of U.S. patent application Ser. No. 12/835,402 filed Jul. 13, 2010, issued as U.S. Pat. No. 8,295,821, which is a continuation of U.S. patent application Ser. No. 11/615,636 filed Dec. 22, 2006, issued as U.S. Pat. No. 7,778,630, the entireties of which are incorporated herein by reference.

FIELD OF THE INVENTION

This invention relates generally to telecommunication, particularly to a system and method for switching a voice call from an Instant Messaging (IM) based voice network to a cellular voice network.

BACKGROUND OF THE INVENTION

In only twenty years, mobile phones, also referred to as cellular phones, have gone from obscure and expensive gadgets to phenomenally common and low-cost personal commodities.

At the same time, a new mobile lifestyle enabled by mobile phones has emerged. People use mobile phones to keep in touch with family and friends while on-the-go. Popular features such as Short Message Service (SMS), camera and music further solidify cellular phones as must-have items for consumers.

With the addition of Internet access, availability of WiFi hotspots, and popularity of Instant Messaging, a new breed of dual-mode mobile phones has arrived. Besides cellular telephone service, these new dual-mode mobile phones can receive Instant Messaging (IM) based telephone services such as Yahoo! Messenger with Voice network, Google Talk, American Online (AOL) Instant Messenger Phoneline Service and Skype by connecting to a private WiFi access point at home, or by connecting to a public WiFi access point at a hotspot. These IM-based telephone services oftentimes provide alternative voice service and advanced features that complement the cellular counterpart.

As these IM-based telephone services are commonly adopted by dual-mode mobile phone users, a new problem surfaces: IM-based voice calls are dropped as soon as a user is out of range of a WiFi access point or hotspot. For example, in one scenario an individual lives in a neighborhood with good cellular coverage. He subscribes broadband service from the local cable company and has installed a WiFi access point for convenience. He recently purchased a dual-mode mobile phone and begins using Yahoo Messenger with Voice service at home. The individual particularly enjoys chatting with his mother in Budapest using the IM-based voice network Yahoo Messenger with Voice in the evening while walking his dog. Unfortunately, the phone call is abruptly cut off whenever he walks beyond the coverage of his WiFi access point. The individual must make a cellular phone call to resume the conversation.

In another scenario, on a typical day before heading to work, another dual-mode phone user enjoys having a cup of coffee at a downtown café that provides hotspot Internet access. Usually, the user uses her dual-mode mobile phone to make several SKYPE phone calls over the Hotspot to start the day. In one instance, the user calls a local utility company to file a complaint. After waiting 15 minutes for a utility company customer service representative, and at which time the user needs to leave for work, she is connected to a customer service representative. To her dismay, the SKYPE phone call is disconnected when she leaves the café and walks to her car in the parking lot.

Therefore, there is a need to provide a system and method to switch a voice call from an IM voice network to a cellular voice network.

SUMMARY OF THE INVENTION

In one aspect the present invention includes a system for switching a voice call from an IM voice network to a cellular voice network including a service gateway associated with the IM-based and cellular voice networks and logic for determining the circumstances under which the voice call is switched to the cellular voice network. The service gateway is preferably adapted to receive voice calls from a call network and create call records identifying the voice calls. In one embodiment the call record includes an IM user identity, a call reference and a cellular phone number.

In another aspect the present invention includes a wireless phone adapted to switch an IM-based voice call to a cellular-based voice call, the phone preferably having an IM phone agent, a cellular phone agent and a switchover agent. In one embodiment the IM phone agent processes IM-based voice calls from a service gateway via an IM voice network using an IM user identity. Similarly, the cellular phone agent processes cellular-based voice calls from a service gateway via a cellular voice network using a cellular phone number. In a preferred embodiment the phone includes an audio module.

In another aspect the present invention includes a method of switching an IM-based voice call to a cellular-based voice call in which a voice call destined for a wireless phone is received in a service gateway, a first call record associated with the service gateway identifying the voice call is created, and an IM-based voice call is established over an IM voice network with an IM phone agent associated with the wireless phone, wherein information about the IM-based voice call is included in the first call record. The voice call destined for the wireless phone is connected to the IM-based voice call, whereby at least a portion of the first call record is sent to a switchover agent associated with the wireless phone. A second call record is created which is associated with the wireless phone wherein the second call record includes at least a portion of the first call record, and further information about the IM-based voice call. A cellular-based voice call is established including information about the cellular-based voice call in the first call record, the cellular-based voice call is associated with the IM-based voice call, a signal is sent to a cellular phone agent associated with the wireless phone indicating that the cellular-based voice call is for switch over purpose, and the cellular-based voice call is established with the service gateway.

In one embodiment the service gateway establishes the IM-based voice call with the IM phone agent using an IM user identity over the IM voice network. In another embodiment the service gateway communicates with the IM phone agent using a protocol such Session Initiation Protocol for Instant Messaging and Presence Leveraging Extensions (SIMPLE) protocol, an Extensible Messaging and Presence Protocol (XMPP), an IM protocol based on Open System for Communication in Realtime (OSCAR) or a proprietary protocol.

In another embodiment the wireless phone includes an audio module, whereby the IM-based voice call is connected to the audio module by sending voice signals from the IM-based voice call to the audio module and by sending voice signals from the audio module to the IM-based voice call.

In another embodiment a method is provided in which the service gateway switches the voice call destined for the wireless phone from the IM-based voice call to the cellular-based voice call based on information about one or more of the IM-based and cellular-based voice calls. In another embodiment the service gateway connects the voice call destined for the wireless phone to the cellular-based voice call by sending voice signals from the voice call destined for the wireless phone to the cellular-based voice call and by sending voice signals from the cellular-based voice call to the voice call destined for the wireless phone. In another embodiment the service gateway disconnects the voice call destined for the wireless phone from the IM-based voice call by not sending voice signals from the voice call destined for the wireless phone to the IM-based voice call, and by not sending voice signals from the IM-based voice call to the voice call destined for the wireless phone.

In another embodiment the service gateway sends a switchover command having a call reference to the switchover agent. The service gateway may send the switch over command to the switchover agent via a messaging service such as a Short Message Service, a Multimedia Messaging Service or an Instant Messaging service, or via the IM-based voice call or via the cellular-based voice call.

In yet another embodiment the switchover agent may request a user of the wireless phone whether the user wishes to switch from the IM-based voice call to the cellular-based voice call.

In still another embodiment a method of the present invention can include monitoring of the voice quality of at least one of the IM-based voice call and the cellular-based voice call and determining whether to switch the voice call destined for the wireless phone based on attributes of voice quality.

In another embodiment a method of the present invention may include the wireless phone establishing a cellular-based voice call to the service gateway after establishing an IM-based voice call.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

DETAILED DESCRIPTION OF THE PREFERRED EMBODIMENTS

In the following description, for the purposes of explanation, specific numbers, materials and configurations are set forth in order to provide a thorough understanding of the invention. It will be apparent, however, to a person of ordinary skill in the art, that these specific details are merely exemplary embodiments of the invention. In some instances, well known features may be omitted or simplified so as not to obscure the present invention. Furthermore, reference in the specification to "one embodiment" or "an embodiment" is not meant to limit the scope of the invention, but instead merely provides an example of a particular feature, structure or characteristic of the invention described in connection with the embodiment. Insofar as various embodiments are described herein, the appearances of the phase "in an embodiment" in various places in the specification are not meant to refer to a single or same embodiment.

Figure 1:
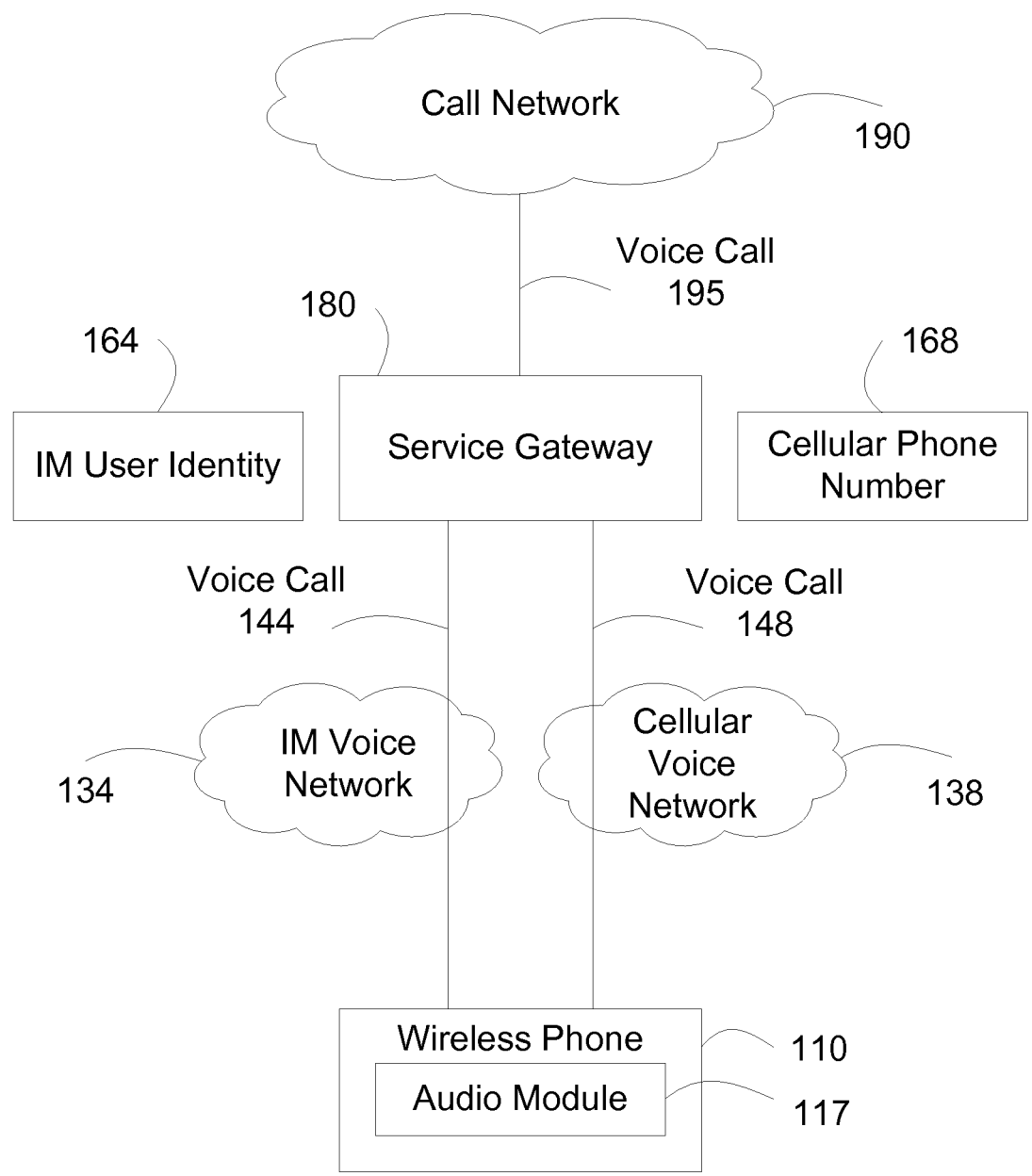
FIG. 1 illustrates a system in accordance with one aspect of the present invention for switching a voice call from an Instant Messaging (IM) based voice network to a cellular voice network.

With reference to the drawings, wherein like numerals indicate like elements, there is shown in FIG. 1 in accordance with at least one embodiment, a simplified block diagram depicting a system for switching over a voice call from an Instant Messaging voice network to a cellular voice network. A service gateway 180 provides to a wireless phone 110 a voice call service. As will be apparent to those having skill in the art, service gateway 180 may include any device or devices suitable to serve as a network node equipped for interfacing with another network that uses different protocols and as such may contain devices such as protocol translators, impedance matching devices, rate converters, fault isolators, or signal translators as necessary to provide system interoperability. Service gateway 180 may comprise a protocol translation/mapping gateway which interconnects networks with different network protocol technologies by performing the required protocol conversions. Service gateway 180 may be a computer configured to perform the tasks of a gateway and/or a router.

In one embodiment, wireless phone 110 connects to an IM voice network 134 to receive the voice call service 190 using an IM user identity 164. IM voice network 134 may be selected from any suitable Instant Messaging (IM) based voice network, such as but not limited to Yahoo! Messenger with Voice network, Google Talk network or American Online (AOL) Instant Messenger Phoneline Service network or the like. IM voice network 134 may include Skype voice network. IM user identity 164 is preferably any suitable identifier such as but not limited to a user name, screen name or a telephone number.

In one embodiment, wireless phone 110 connects to IM voice network 134 using a WiFi network, for example, a hotspot WiFi network, a corporate WiFi network, a municipal WiFi network, or a residential WiFi network. IM voice network 134 may include the Internet and/or an Internet service provider network.

In one embodiment, wireless phone 110 connects to a cellular voice network 138 to receive the voice call service. Wireless phone 110 receives the voice call service using a cellular phone number 168. Cellular voice network 138 includes a cellular network. Cellular voice network 138 is preferably selected from among a Global System for Mobile Communications (GSM) network, a Wideband Code Division Multiple Access (W-CDMA) network, a General Packet Radio Service (GPRS) network, a Code Division Multiple Access One (cdmaOne) network, a CDMA2000 network, a third-generation (3G) network, a CDMA 1x Evolution-Data Optimized (1xEV-DO) network, a High-Speed Downlink Packet Access (HSDPA) network, or an Enhanced Data Rates for GSM Evolution (EDGE) network.

Service gateway 180 connects to a call network 190. Call network 190 is preferably selected from a Public Switched Telephone network (PSTN), a cellular voice network, or a corporate telephone network. In one embodiment, call network 190 includes an IM voice network 134. Service gateway 180 processes a voice call 195 with call network 190. Voice call 195 may be selected from an IM-based voice call, such as a Yahoo! Messenger with Voice call, Google Talk voice call, American Online Instant Messenger Phoneline call, or Skype voice call; or a public or corporate telephone call.

In one embodiment, service gateway 180 receives voice call 195 destined for wireless phone 110. Service gateway 180 establishes an IM-based voice call 144 to wireless phone 110 over IM voice network 134 using IM user identity 164. Service gateway 180 connects voice call 195 to voice call 144. After voice call 144 is established, wireless phone 110 connects to voice call 195 via voice call 144.

During voice call 195, service gateway 180 establishes a cellular-based voice call 148 to wireless phone 110 over cellular voice network 138 using cellular phone number 168. Voice call 148 is related to voice call 195. Service gateway 180 connects voice call 148 to voice call 195. Wireless phone 110 switches over from voice call 144 to voice call 148. After the switch over is completed, wireless phone 110 connects to voice call 195 via voice call 148.

Figure 2A:
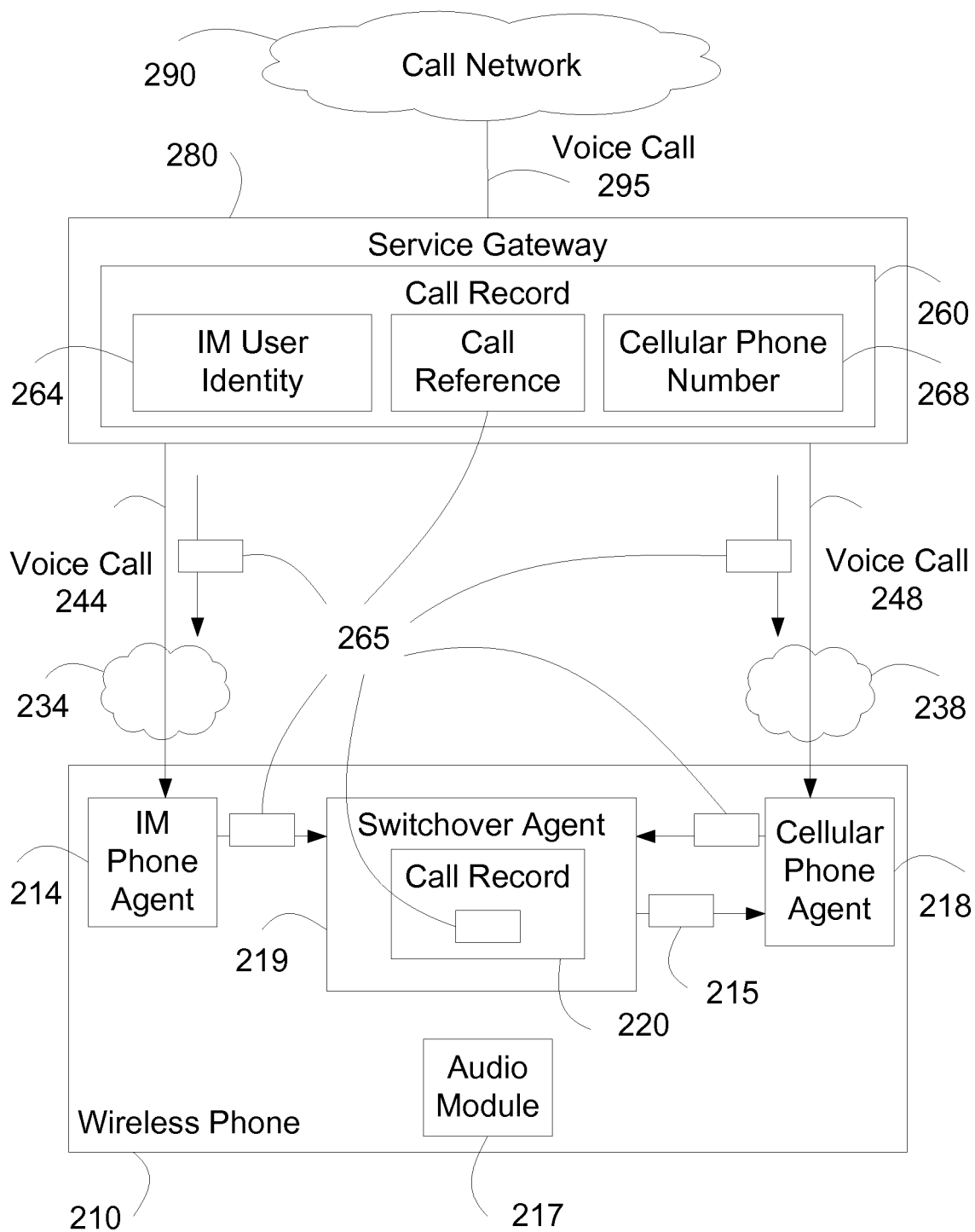
FIG. 2a illustrates a process for establishing a voice call in accordance with one aspect of the present invention.

Now referring to FIG. 2a, in one embodiment a voice call is established wherein wireless phone 210 includes a switchover agent 219, an IM phone agent 214 and a cellular phone agent 218. As will be apparent to one having ordinary skill in the art, the switchover agent 219 may be or include software containing suitable programming, or hardware such as a processor, adapted to perform the switchover agent 219 operations as discussed hereinbelow. Similarly, IM phone agent 214 may be or include a software program and/or suitable processor for the processing of IM-based voice call 244 with service gateway 280. IM phone agent 214 communicates with switchover agent 219 over an Application Programming Interface (API), or an inter-process communication mechanism, such as an inter-process function call. IM phone agent 214 processes IM-based voice call 244 from service gateway 280 over IM voice network 234 using IM user identity 264. Likewise, cellular phone agent 218 may be or include a software program and/or suitable processor for the processing of cellular-based voice call 248 with service gateway 280. Preferably cellular phone agent 218 communicates with switchover agent 219 in a similar fashion as IM phone agent 214. Cellular phone agent 218 processes cellular-based voice call 248 from service gateway 280 over cellular voice network 238 using cellular phone number 268.

In one embodiment, service gateway 280 receives voice call 295 from call network 290 destined for wireless phone 210. Service gateway 280 creates a call record 260 which includes IM user identity 264, cellular phone number 268, and a call reference 265 identifying voice call 295.

Service gateway 280 establishes IM-based voice call 244 with IM phone agent 214 using IM user identity 264 over IM voice network 234. To communicate with IM phone agent 214, service gateway 280 uses a protocol such as but not limited to Session Initiation Protocol for Instant Messaging and Presence Leveraging Extensions (SIMPLE) protocol, an Extensible Messaging and Presence Protocol (XMPP), an IM protocol based on Open System for Communication in Realtime (OSCAR) or a proprietary protocol. Service gateway 280 stores information about IM-based voice call 244 in call record 260.

Service gateway 280 connects voice call 295 to IM-based voice call 244 by sending voice signals from voice call 295 to IM-based voice call 244 and by sending voice signals from voice call 244 to voice call 295.

Wireless phone 210 preferably includes an audio module 217 for telephony functionalities, including for example a speaker and a microphone (not shown). Wireless telephone 210 connects IM-based voice call 244 to audio module 217 by sending voice signals from voice call 244 to audio module 217, and by sending voice signals from audio module 217 to IM-based voice call 244.

During the establishment of IM-based voice call 244, service gateway 280 sends call reference 265 to switchover agent 219. Service gateway 280 may send call reference 265 to switchover agent 219 in a variety of ways as will be apparent and understood to a skilled artisan, such as but not limited to via IM phone agent 214 as part of the call setup procedure for IM-based voice call 244, or in a proprietary header of a SIP INVITE message. In this latter embodiment IM phone agent 214 extracts call reference 265 from the SIP INVITE message and sends call reference 265 to switchover agent 219. Switchover agent 219 creates call record 220. Call record 220 includes call reference 265 and information about IM-based voice call 244. The information about IM-based voice call 244 stored in call record 220 at wireless phone 210 includes transport information for the IM-based voice call 244, such as a transmitting Real-time Transport Protocol/User Datagram Protocol (RTP/UDP) port and a receiving RTP/UDP port at wireless phone 210. The information is for connecting IM-based voice call 244 to audio module 217, for example, by sending voice signals from the receiving RTP/UDP port to audio module 217, and by sending voice signals from audio module 217 to the transmitting RTP/UDP port. In one embodiment, the information includes an audio codec for IM-based voice call 244; service gateway 280 processes voice signals to and from voice call 244 based on the audio codec.

During voice call 295, service gateway 280 uses cellular phone number 268 in call record 260 to establish cellular-based voice call 248 to cellular phone agent 218 over cellular voice network 238. By way of example, service gateway 280 uses Integrated Service Digital Network User Party (ISUP) protocol to communicate with cellular voice network 238, and cellular voice network 238 uses GSM Call Control (CC) protocol to communicate with cellular phone agent 218. Service gateway 280 stores information about voice call 248 in call record 260.

Service gateway 280 sends call reference 265 to switchover agent 219 when establishing voice call 248. Service gateway 280 can send call reference 265 to switchover agent 219 in a variety of ways, such as but not limited to via cellular phone agent 218 as part of the call setup procedure for voice call 248 or as a calling party number. In this latter embodiment, service gateway 280 sends call reference 265 as calling party number in an ISUP Initial Address Message (IAM) to cellular voice network 238. In one embodiment, cellular voice network 238 receives call reference 265 and sends call reference 265 as calling party number to cellular phone agent 218 in a GSM CC SETUP message. Cellular phone agent 218 receives call reference 265 and sends call reference 265 to switchover agent 219.

Switchover agent 219 receives call reference 265. Switchover agent 219 retrieves call record 220 with matching call reference 265. Switchover agent 219 determines that voice call 248 is associated with IM-based voice call 244. Switchover agent 219 sends a response 215 to cellular phone agent 218, indicating that voice call 248 is for switch over purpose. Cellular phone agent 218 receives response 215 and automatically establishes voice call 248 with service gateway 280. In one embodiment, switchover agent 219 does not connect voice call 248 to audio module 217. Switchover agent 219 stores information about voice call 248 in call record 220. The information about voice call 248 stored in call record 220 at wireless phone 210 includes transport information for the cellular-based voice call 248, such as a transmitting cellular channel and a receiving cellular channel at wireless phone 210. The information is for connecting voice call 248 to voice module 217, for example, by sending voice signals from the receiving cellular channel to voice module 217, and by sending voice signals from voice module 217 to the transmitting cellular channel. In one embodiment, the information includes an audio codec for voice call 248; service gateway 280 processes voice signals to and from voice call 248 based on the audio codec.

Figure 2B:
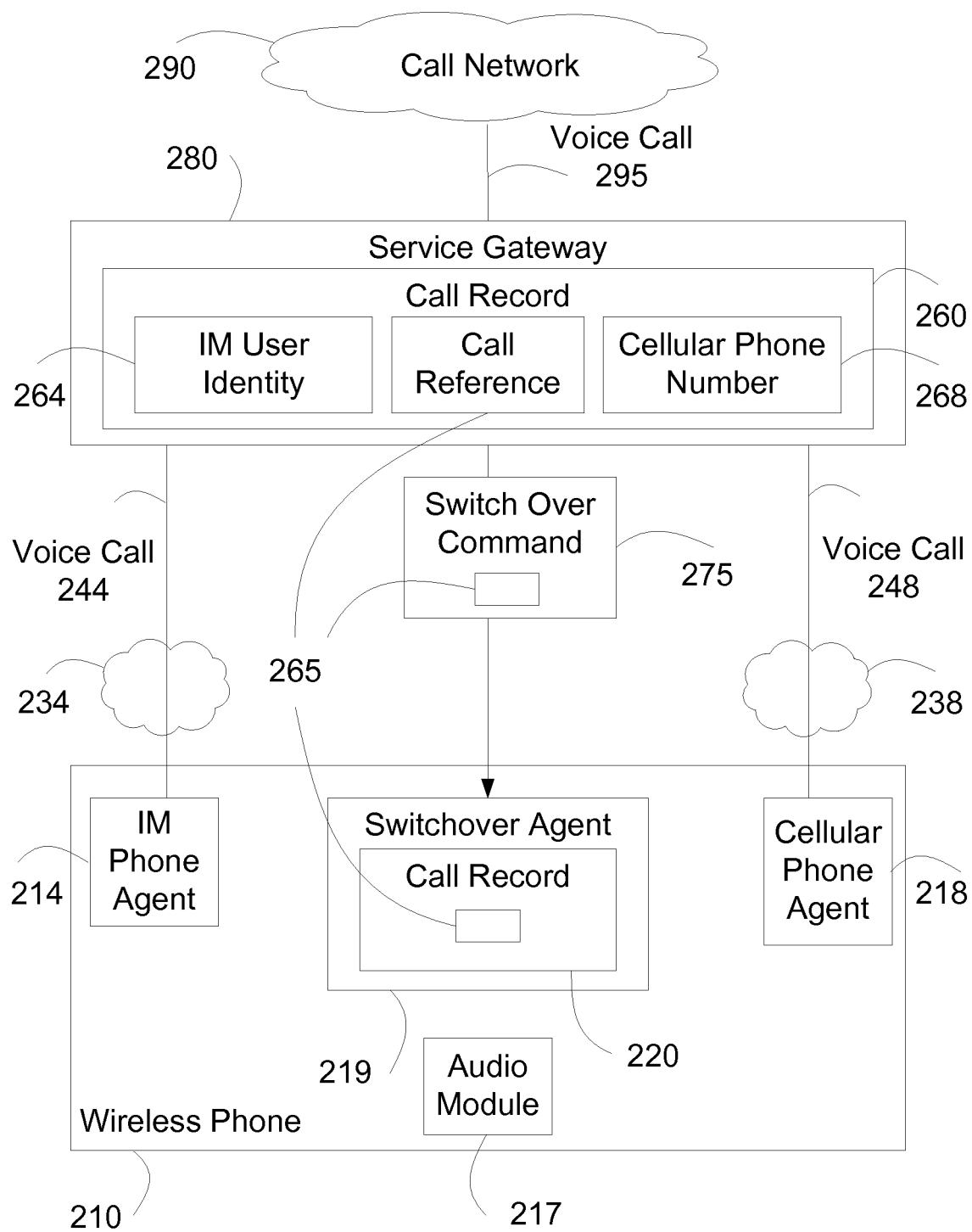
FIG. 2b illustrates a process for switching over a voice call in accordance with one aspect of the present invention.

Now referring to FIG. 2b an embodiment of a process for switching over a voice call in accordance with one embodiment of the present invention is shown. Service gateway 280 connects voice call 295 to IM-based voice call 244 and is in process of switching over to cellular-based voice call 248. A description of the switchover decision is provided in further detail hereinbelow.

Service gateway 280 switches voice call 295 from IM-based voice call 244 to voice call 248 based on information about voice calls 244 and 248 in call record 260. The information about IM-based voice call 244 stored in call record 260 at service gateway 280 includes transport information for the IM-based voice call 244, such as a transmitting Real-time Transport Protocol/User Datagram Protocol (RTP/UDP) port, and a receiving RTP/UDP port at service gateway 280. The information is for connecting IM-based voice call 244 to voice call 295, for example, by sending voice signals from the receiving RTP/UDP port to voice call 295, and by sending voice signals from voice call 295 to the transmitting RTP/UDP port. In one embodiment, the information includes an audio codec for IM-based voice call 244; service gateway 280 processes voice signals to and from voice call 244 based on the audio codec.

The information about voice call 248 stored in call record 260 at service gateway 280 includes transport information for the cellular-based voice call 248, such as a line card or a digital channel at service gateway 280. The information is for connecting voice call 248 to voice call 295, for example, by sending voice signals from the line card to voice call 295, and by sending voice signals from voice call 295 to the line card. In one embodiment, the information includes an audio codec for voice call 248; service gateway 280 processes voice signals to and from voice call 248 based on the audio codec.

Service gateway 280 connects voice call 295 to cellular-based voice call 248 by sending voice signals from voice call 295 to voice call 248; and by sending voice signals from voice call 248 to voice call 295. Service gateway 280 disconnects voice call 295 from IM-based voice call 244 by not sending voice signals from voice call 295 to IM-based voice call 244; and by not sending voice signals from voice call 244 to voice call 295.

In one embodiment, service gateway 280 sends a switch over command 275 to switchover agent 219. Switch over command 275 includes call reference 265. Service gateway 280 preferably sends switch over command 275 to switchover agent 219 directly via a messaging service, such as a Short Message Service (SMS), a Multimedia Messaging Service (MMS) or an Instant Messaging (IM) service. Service gateway 280 may send switch over command 275 via voice call 248 or via IM-based voice call 244.

Switchover agent 219 receives switch over command 275. Switchover agent 219 retrieves call record 220 that matches call reference 265 in switch over command 275. Switchover agent 219 determines to switch over from IM-based voice call 244 to voice call 248 based on information about voice calls 244 and 248 in call record 220. Switchover agent 219 disconnects IM-based voice call 244 from audio module 217 by not sending voice signals from voice call 244 to audio module 217 and by not sending voice signals from audio module 217 to voice call 244. Switchover agent 219 connects voice call 248 to audio module 217 by sending voice signals from voice call 248 to audio module 217 and by sending voice signals from audio module 217 to voice call 248.

In one embodiment, switchover agent 219 responds to service gateway 280 that the switch over is completed.

A wireless phone 210 preferably includes an input module such as but not limited to a keypad and may include a display screen. In one embodiment, after receiving switch over command 275, switchover agent 219 switches over based on user input. Switchover agent 219 notifies user of wireless phone 210 such as by displaying a textual or graphical representation of the switchover offer on the display screen, to which the user may respond by inputting a response using an input module on the phone 210, such as a keypad. Switchover agent 219 receives an input indicating that the switchover offer has been accepted by the user, and switches over. As will be apparent to those having skill in the art, a switchover offer may be an audio offer to which a user can respond verbally or using an input module.

In one embodiment, after receiving switchover command 275, switchover agent 219 monitors the voice quality of voice calls 244 and 248. For example, switchover agent 219 receives voice quality of IM-based voice call 244 from IM phone agent 214, and voice quality of voice call 248 from cellular phone agent 218. In another example, switchover agent 219 receives voice quality of IM-based voice call 244 from IM voice network 234 and voice quality of voice call 248 from cellular voice network 238. In yet another example, switchover agent 219 receives voice quality of voice calls 244 and 248 from service gateway 280. The voice quality can be measured using an attribute indicative of radio signal strength, such as but not limited to voice quality measured using dropped packet rate, dynamic jitter buffer depth or the like. In another embodiment, switchover agent 219 makes the decision to switch over the call based on a determination that the voice quality of voice call 248 is better than the voice quality of IM-based voice call 244, and switches over. In one embodiment, switchover agent 219 determines that the voice quality of IM-based voice call 244 is below an acceptable threshold, and switches over.

In one embodiment, service gateway 280 may establish voice call 248 based on specific criteria, such as when service gateway 280 determines that wireless phone 210 is under coverage of cellular voice network 238. In another embodiment, service gateway 280 establishes voice call 248 when service gateway 280 determines that the voice quality of IM-based voice call 244 is below an acceptable threshold.

In another embodiment, after establishing IM-based voice call 244, wireless phone 210 establishes voice call 248 to service gateway 280.

In one embodiment, wireless phone 210 makes an outgoing call using IM-based voice service. The outgoing call includes an IM-based voice call 244 between service gateway 280 and wireless phone 210. Service gateway 280 establishes a cellular-based voice call 248 with wireless phone 210 so that service gateway 280 can switch over from the IM-based voice call 244 to the cellular-based voice call 248.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of switching an Instant Messaging (IM)-based first voice call to a second voice call comprising the steps of: receiving an incoming voice call destined for a telephone number, creating a first call record identifying the incoming voice call, establishing over an IM voice network an IM-based first voice call with an IM phone agent, including in the first call record first information about the IM-based first voice call, connecting the incoming voice call to the IM-based first voice call, sending at least a portion of the first call record to a switchover agent, creating a second call record associated with the telephone number including the at least a portion of the first call record and second information about the IM-based first voice call, establishing a second voice call and including information about the second voice call in the first call record, associating the second voice call with the IM-based first voice call, sending a signal to a phone agent indicating that the second voice call is for switch over purpose, and establishing the second voice call.

2. The method according to claim 1 wherein the telephone number is associated with a phone.

3. The method according to claim 1 wherein a service gateway switches the incoming voice call destined for the telephone number from the IM-based first voice call to the second voice call.

4. The method according to claim 1 wherein the switchover is based on whether the quality of the second voice call is better than IM-based voice call.

5. The method according to claim 1 wherein the switchover is based on a user accepting a switchover offer from the switchover agent.

6. The method according to claim 1 comprising establishing the second voice call using a user identity wherein the user identity is different from the telephone number.

7. The method according to claim 1 comprising establishing the IM-based first voice call using an IM user identity wherein the IM user identity is different from the telephone number.

8. A service gateway comprising a computer readable medium with software stored thereon and a processor configured to receive at least one incoming voice call destined for a telephone number from a call network and create at least one first call record associated with the service gateway identifying the at least one incoming voice call, wherein the software, when executed by the processor, directs the processor to determine the circumstances under which the incoming voice call is switched to a second voice network, to establish an Instant Messaging (IM)-based first voice call to the telephone number over an IM first voice network, to include in the first call record first information about the IM-based first voice call, to send at least a portion of the first call record to a switchover agent associated with the service gateway, to create a second call record associated with the telephone number including the at least a portion of the first call record and second information about the IM-based first voice call, to establish a second voice call and include information about the second voice call in the first call record, to associate the second voice call with the IM-based first voice call, and to send a signal to the switchover agent indicating that the second voice call is for switch over purpose.

9. The service gateway according to claim 8 operable to establish the second voice call.

10. The service gateway according to claim 8 wherein the telephone number is associated with a phone.

11. The service gateway according to claim 8 wherein the service gateway comprises software which, when executed by the processor, directs the processor to connect the incoming voice call from the call network to the IM-based voice call.

12. The service gateway according to claim 8 wherein the service gateway comprises software which, when executed by the processor, directs the processor to establish a second voice call to a telephone number over the second voice network using a phone number during the incoming voice call from the call network.

13. The service gateway according to claim 8 wherein the service gateway software directs the processor to connect the second voice call over the second voice network to the incoming voice call from the call network.

14. The service gateway according to claim 8, wherein the call record comprises an IM user identity, a call reference and/or a phone number.

15. The service gateway according to claim 8 wherein the information about the second voice call comprises transport information for the second voice call for connecting the voice call to a voice module.

16. A non-transient, computer readable, storage medium containing a program, which when executed by a processor causes the processor to perform actions, comprising: receiving an incoming voice call destined for a telephone number, creating a first call record identifying the voice call, establishing over an Instant Message (IM) first voice network an IM-based voice call with an IM phone agent, including in the first call record first information about the IM-based first voice call, connecting the incoming voice call to the IM-based voice call, sending at least a portion of the first call record to a switchover agent, creating a second call record associated with the telephone number including the at least a portion of the first call record and second information about the IM-based first voice call, establishing a second voice call and including information about the second voice call in the first call record, associating the second voice call with the IM-based first voice call, sending a signal to a phone agent indicating that the second voice call is for switch over purpose, and establishing the second voice call.

17. The non-transient, computer readable, storage medium containing a program according to claim 16 wherein the telephone number is associated with a phone.

18. The non-transient, computer readable, storage medium containing a program according to claim 16 wherein a service gateway switches the incoming voice call destined for the telephone number from the IM-based first voice call to the second voice call.

19. The non-transient, computer readable, storage medium containing a program according to claim 16 wherein the switchover is based on whether the quality of the IM-based voice first call is below an acceptable threshold.

20. The non-transient, computer readable, storage medium containing a program according to claim 16 wherein the switchover is based on a user accepting a switchover offer from the switchover agent.

21. The non-transient, computer readable, storage medium containing a program according to claim 16 wherein in the action of establishing over an IM voice network an IM-based first voice call with an IM phone agent the IM phone agent is associated with the phone.

22. The non-transient, computer readable, storage medium containing a program according to claim 16 wherein in the action of sending at least a portion of the first call record to a switchover agent the switchover agent is associated with the phone.

23. A wireless phone comprising a processor configured to switch an Instant Messaging (IM)-based first voice call to a second voice call, an IM phone agent comprising software or a processor operable to process an IM-based first voice call via an IM voice first network using an IM user identity, an agent comprising software or a processor operable to process a second voice call from a second voice network, and to receive a call reference and to send the call reference to a switchover agent, and a switchover agent comprising software or a processor operable to receive a call reference from at least the agent and operable to create a call record including the call reference and information about the IM-based voice call, retrieve the call record that matches the call reference, and determine whether a voice call is associated with the IM-based first voice call, wherein the switchover agent further comprises software or a processor operable to send a response to the agent, indicating that the voice call is for switch over purpose, and wherein the switchover agent comprises storage capacity to store information about the IM-based first voice call in the call record, wherein the agent is operable to automatically establish a second voice call upon receiving a response from the switchover agent.

24. The wireless phone according to claim 23 wherein the information about the IM-based first voice call includes transport information for the second voice call for connecting the voice call to a voice module.

\* \* \* \* \*